United States Patent [19]

Cooper et al.

[11] 4,152,609

[45] May 1, 1979

[54] ROTOR MEMBER FOR SUPERCONDUCTING GENERATOR

[75] Inventors: Glenn D. Cooper, North Huntington; Donald C. Litz, Murrysville, both of Pa.

[73] Assignee: Westinghouse Electric Corp., Pittsburgh, Pa.

[21] Appl. No.: 734,941

[22] Filed: Oct. 22, 1976

[51] Int. Cl.$^2$ ............................................. H02K 9/00
[52] U.S. Cl. .................................. 310/52; 310/40 R; 310/261
[58] Field of Search .................. 310/52, 10, 40, 54, 310/64, 261

[56] References Cited

U.S. PATENT DOCUMENTS

| | | |
|---|---|---|
| 3,644,766 | 2/1972 | Hughes ................................ 310/165 |
| 3,648,082 | 3/1972 | MacNab ................................ 310/10 |
| 3,679,920 | 7/1972 | MacNab ................................ 310/10 |
| 3,942,053 | 3/1976 | Abolins ................................ 310/10 |
| 3,956,648 | 5/1976 | Kirtley ................................ 310/10 |
| 3,999,091 | 12/1976 | Kirtley ................................ 310/40 |
| 4,017,755 | 4/1977 | Litz ................................ 310/52 |

*Primary Examiner*—R. Skudy
*Attorney, Agent, or Firm*—G. H. Telfer

[57] ABSTRACT

A rotor is provided for an alternating current generator carrying a superconducting field winding and having a combined damper and shield member on the rotor. The damper-shield member is a composite cylindrical member extending over the field winding and consisting of concentric inner and outer cylinders of a high-strength, non-magnetic alloy and an intermediate cylinder of aluminum or other material of high electrical conductivity.

9 Claims, 3 Drawing Figures

ROTOR MEMBER FOR SUPERCONDUCTING GENERATOR

BACKGROUND OF THE INVENTION

The present invention relates to superconducting generators, and more particularly to a combined damper and shield for generator rotors having superconducting field windings.

Large alternating current generators with superconducting field windings offer great potential benefits. Such machines operate with no losses in the field winding itself and thus can provide higher magnetic fields than conventional generators and with greater efficiency. This allows the generation of more power per unit volume of the generator and thus makes it possible to achieve greatly increased ratings or to reduce substantially the size and cost of a machine of given rating. The reduction in electrical losses during operation of the machine is also an important advantage and represents a very substantial saving in operating cost.

Such machines have rotating field members consisting of a cylindrical rotor with the field winding disposed in slots in its surface. The field winding conductors are made of superconducting material and means are provided for circulating a cryogenic coolant fluid during operation of the machine to maintain the windings in the superconducting state, that is, at a temperature below the critical temperature of the material. An external refrigeration system is provided for this purpose to supply liquid helium to the winding during operation, the helium exhausting in the gaseous state for return to the refrigerator.

In such a rotor, it is necessary to protect the superconducting field winding from alternating current magnetic fields in the air gap of the machine which may be caused by harmonics in the armature magnetomotive force and by unbalanced loads on the generator. Such fields, as well as the large transient fields that may occur during faults, could cause large eddy current losses in the field winding and produce sufficient heat to result in loss of superconductivity. Shielding is, therefore, required to protect the winding and can be provided by a cylindrical shield of high electrical conductivity surrounding the rotor and rotating with it. During disturbances on the system to which the generator is connected, the rotor will tend to oscillate at a low frequency about its steady-state torque angle and damping must be provided to attenuate these oscillations in order to return to steady-state operation. This damping function can be performed by the same high-conductivity cylindrical member, which thus performs the two functions of damping and shielding.

The mechanical design of such a combined damper-shield presents difficult problems. The shield must have high electrical conductivity and it must also have sufficient mechanical strength to withstand the large forces to which it is subjected under fault conditions. In addition, the damper-shield and the rotor must be capable of withstanding the extremely high torques that may occur during a fault and the drive shaft which drives the rotor should be protected against these dangerously high torques. The damper-shield must also be mounted on the rotor in a manner which permits relative movement to allow for the differential thermal contraction of the rotor body when it is cooled to cryogenic temperature for operation, and to permit some relative axial movement between the damper-shield cylinder and the rotor body which results from different bending deflections during operation.

SUMMARY OF THE INVENTION

The present invention provides a construction for rotors having a superconducting field winding which includes a combined damper-shield member mounted on the rotor in a manner to meet the requirements outlined above.

More specifically, a damper-shield member is provided consisting of a composite cylindrical member combining the necessary mechanical strength with the required electrical conductivity. The shield includes inner and outer concentric cylinders of a high-strength, non-magnetic alloy, such as a nickel alloy, and an intermediate cylinder of material of high conductivity, such as aluminum or copper. The cylinders are proportioned to give the necessary strength and conductivity and may be bonded or otherwise joined together. Coolant ducts may be provided between the outer and intermediate cylinders to remove the heat generated in the intermediate cylinder. The damper-shield surrounds the rotor body and is rigidly attached to the rotor body only at the end of the rotor opposite the drive end. In this way, the torsional flexibility of the rotor body is interposed between the shield and drive shaft, so that the drive shaft is protected from excessive or dangerous torques under fault conditions. The other end of the damper-shield is supported on the rotor body adjacent the drive end in a manner to permit relative movement to allow the necessary differential contraction when the rotor body is being cooled to cryogenic temperatures, and also to permit relative movement under the very high forces which may occur during fault conditions. Sufficient flexibility is included in both the attaching and the support means to allow the necessary small relative axial motion due to the different bending deflections of the rotor body and of the shield during operation. In this way, a very effective damper-shield is provided for protection of the field winding and for the necessary damping, and which also meets the difficult mechanical requirements.

BRIEF DESCRIPTION OF THE DRAWINGS

The invention will be more fully understood from the following detailed description, taken in connection with the accompanying drawings, in which.

DESCRIPTION OF THE PREFERRED EMBODIMENT

Figure 1:
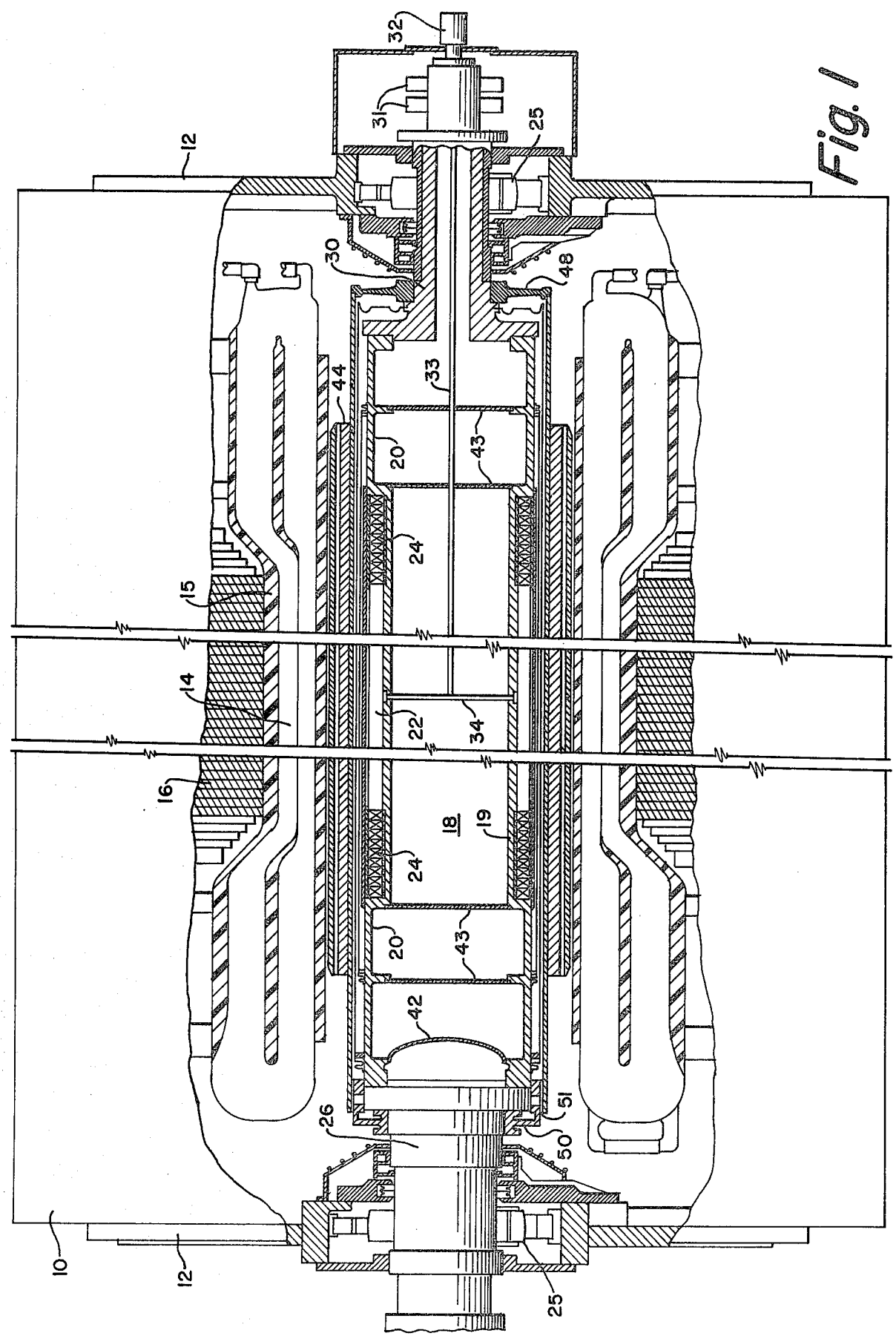
FIG. 1 is a side view of a generator embodying the invention with the housing partly broken away.
Figure 2:
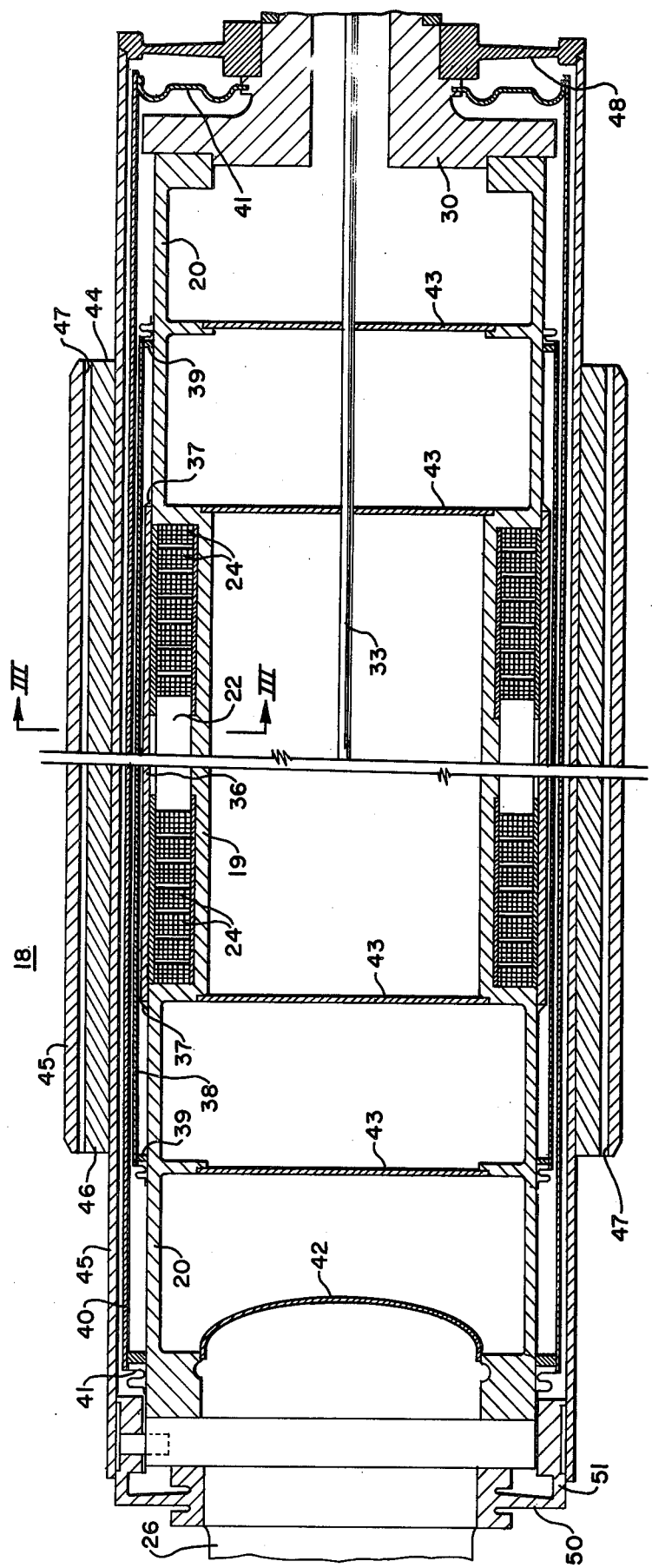
FIG. 2 is an enlarged side view of the rotor member of the machine of FIG. 1.
Figure 3:
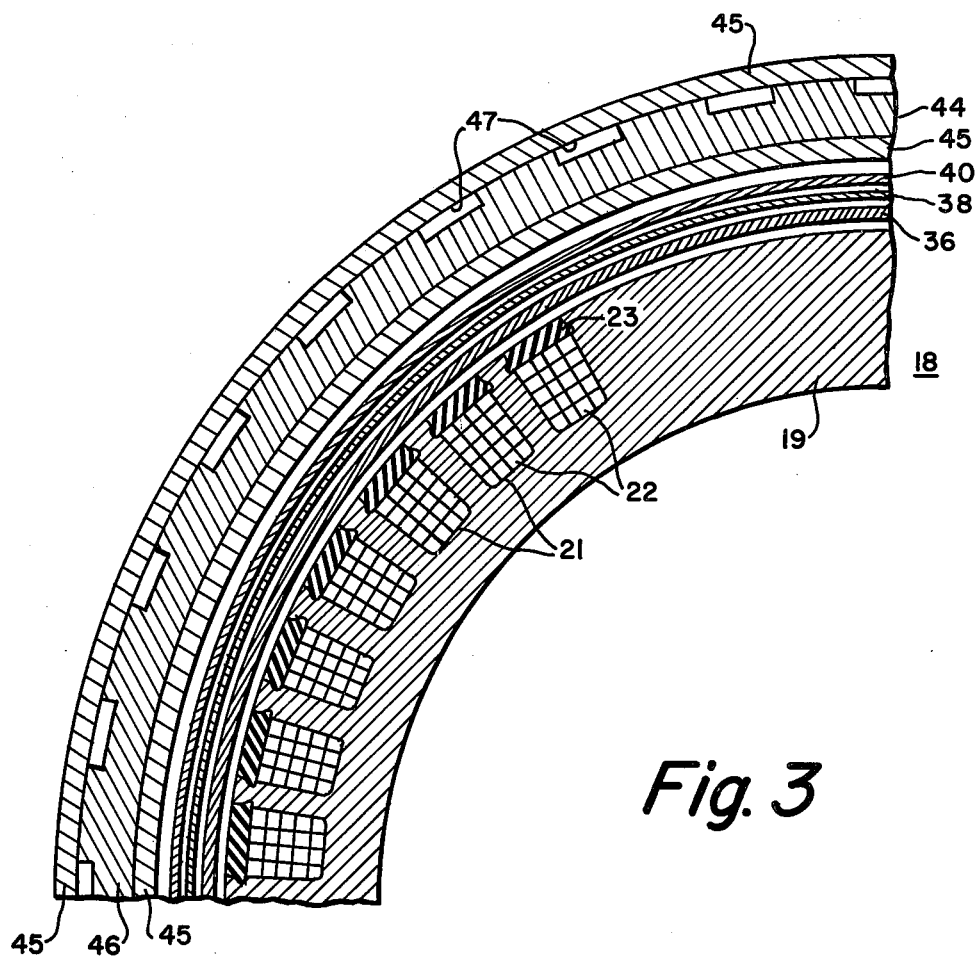
FIG. 3 is a transverse sectional view of the rotor substantially on the line III—III of FIG. 2.

The invention is shown in the drawings embodied in a rotor for a large superconducting alternating current machine such as a turbine generator. The stator and housing of the machine may be of any suitable or desired construction. As shown, the machine has a gas-tight housing 10 closed at the ends by bearing brackets 12. The stator member includes an armature winding 14 of any suitable type, shown as an air gap winding of cylindrical configuration embedded in a monolithic insulating body 15. The armature winding 14 is supported in a laminated magnetic shield 16 surrounding the winding and suitably supported in the housing 10.

The construction of the stator member may be of any suitable type and has not been shown in detail as it is not a part of the present invention. The housing 10 is filled with a coolant gas which is preferably helium because it is non-inflammable and a supply of helium will be required in any event for cooling the rotor. The armature winding 14 and the magnetic shield 16 may additionally be water-cooled, if desired.

The rotor 18 consists of a hollow cylindrical rotor body 19 of a suitable material, such as a non-magnetic nickel alloy. The rotor body 19 terminates at each end in torque tube portions 20 having a wall thickness which is adequate to transmit the required torque but thin enough and long enough to minimize heat flow into the cryogenic portion of the rotor. The central body portion 19 of the rotor has longitudinal slots 21 in which the field windings 22 are placed and retained in position by wedges 23. The field windings 22 are made of any suitable superconducting material such as multi-filamentary condutors of niobium-titanium alloy in a copper or copper-nickel matrix. Such conductors are known in the art and are available but any suitable superconductive material could be utilized. The windings 22 are arranged in the slots 21 in any suitable or desired manner to form a field winding with circumferential end turns 24 at each end of the rotor body 19.

The rotor 18 is provided with shaft portions at each end thereof supported in suitable bearings 25 in the end brackets 12. The shaft portion 26 at the left-hand end in FIG. 1 is a drive shaft connected in any suitable manner to the end of the torque tube 20 to drive the rotor 18. The shaft portion 30 at the opposite end is not required to transmit any substantial torque and can, therefore, be of smaller diameter as shown. The shaft portion 30 carries collector rings 31 at its outer extremity for supplying excitation current to the field winding 22 through suitable leads from an external exciter of any suitable type. The shaft portion 30 is made hollow to provide for entrance of the cryogenic coolant fluid for the superconducting field winding. Any suitable type of cooling system may be utilized in which liquid helium is supplied from an external refrigeration system. As shown, the liquid helium is introduced into the rotor through a port assembly 32 to a passage 33 on the axis of the rotor. The passage 33 extends to the center of the rotor and the coolant flows radially through a heat exchanger 34 into coolant passages in the winding 22 and flows in opposite directions toward the ends of the rotor. The helium gas discharged from the winding 22 may be utilized for other cooling purposes on the rotor, such as for cooling the torque tubes 20 and the field winding leads, and is finally exhausted through the hollow shaft portion 30 and discharged from the machine through the port assembly 32 for return to the refrigerator. It will be understood, of course, that any suitable coolant or cooling system may be utilized to keep the windings 22 at superconducting temperature during operation of the machine.

A retaining ring or field enclosure 36 is shrunk on the rotor body. This enclosure is a cylindrical steel tube which extends over the rotor body past the end turns 24 of the field winding at each end and is shrunk onto the rotor body so as to retain the field winding end turns in position. The enclosure 36 also serves to contain the helium coolant and, therefore, is seal-welded at each end to the rotor body 19 as indicated at 37. A radiation shield 38 is provided outside the enclosure 36 to protect the cryogenic portions of the rotor body from thermal radiation. The shield 38 may be a thin tubular sheet metal member and is welded or otherwise attached to the rotor body 19 beyond the ends of the enclosure 36, as indicated at 39, at least one of the connections 39 including sufficient flexibility to permit differential longitudinal expansion and contraction. A vacuum shell 40 is disposed outside of the radiation shield 38. The vacuum shell 40 may also be a thin sheet metal cylinder surrounding the rotor body and radially spaced from the radiation shield. The vacuum shell 40 extends axially beyond the radiation shield and is attached at one end to the rotor body and at the other end to the shaft portion 30 with bellows-type seals 41. A similar vacuum seal 42 closes the drive end of the hollow rotor body. The vacuum shell 40, with the seals 41 and 42, forms a vacuum-tight enclosure and the rotor is evacuated within this enclosure. Radiation shields 43 within the rotor complete the cryogenic zone.

As previously mentioned, it is necessary to protect the superconducting field winding 22 from losses caused by alternating current magnetic fields in the air gap. Steadystate fields of this kind may be caused by spatial hermonics in the armature magnetomotive force and by unbalanced loads on the generator which cause rotating fields in the air gap. Large transient fields may also occur during faults and system disturbances on the system to which the generator is connected. Many of these fields, if allowed to penetrate the field winding, could cause sufficient heating due to eddy current losses to result in loss of superconductivity of the winding which would require immediate shut-down of the machine. For this reason, the winding must be shielded from magnetic fields in the air gap which can be done by means of a cylindrical metal shield surrounding the rotor and of sufficient thickness to provide the necessary shielding by attenuation of the fields. The rotor also requires damping because of its tendency to oscillate at a low frequency of the order of 1 to 3 Hz about its steady-state torque angle during disturbances on the system. These oscillations must be attentuated by suitable damping in order for the rotor to return to steady-state operation. The two functions of shielding and damping can both be performed by a single cylindrical member of high electrical conductivity carried on the rotor.

For this purpose, a combined damper and shield 44 is provided. This damper-shield must meet numerous requirements. It must provide the necessary electromagnetic shielding to protect the field winding from alternating fields in the air gap, as discussed above, and must be capable of dissipating the heat generated by the steady-state shielding currents induced by such fields as well as having sufficient thermal capacity to absorb the heat resulting from the high currents induced during faults or by large load unbalance. The shield must also be capable of providing the necessary damping to minimize rotor oscillations during system disturbances. When a fault occurs, the shield is subject to high torques and also to large crushing forces due to flux concentration in the air gap. The crushing force has two components, a uniform radial force around the entire circumference of the shield and a sinusoidally distributed radial force. The first of these causes uniform compressive stresses opposing the tensile stresses due to rotation of the shield. The second component causes large bending stresses and tends to distort the cylindrical shield into an elliptical shape. The circumferential stresses due to rotation are, of course, superimposed on these crushing forces. Additionally there occur simultaneously, torsional shear stresses which combine with the circumferential stresses.

The damper-shield must be of such mechanical design that it can withstand this severe loading without incurring bending stresses above its yield strength and without bending deflections large enough to cause it to contact the rotor structure. Even momentary contact could easily cause sufficient heat flow into the cryogenic region of the rotor to cause loss of superconductivity in the field winding. Merely increasing the radial thickness of the cylindrical shield is not an acceptable solution to the mechanical design problem since it is necessary to minimize the space between the field and armature windings in order to maximize the flux linkages and power density. The shield must also be mounted on the rotor in a manner that adequately supports the shield but allows large differential thermal expansion and contraction due to the great temperature difference between the shield and the cryogenic portions of the rotor, and which is capable of absorbing axial motions caused by the different flexural stiffnesses of the rotor components, as well as protecting the generator drive shaft against excessive transient torques.

The damper-shield 44 shown in the drawing is a composite cylindrical shield member which meets the severe mechanical requirements discussed above as well as having the necessary electrical conductivity for effective shielding and damping. The shield 44 is made up of three concentric cylinders. The inner and outer cylinders 45 are designed for mechanical stength and are made of a suitable high-strength, non-magnetic material such as nickel steel or a nickel alloy of the type commercially available under the name INCONEL. The intermediate cylinder 46 is designed for high electrical conductivity and is made of a low-resistance material such as aluminum or copper, or an aluminum or copper alloy. This composite structure can be designed to meet the mechanical requirements. Under bending forces, the maximum bending stresses occur in the outer layers and thus in the high-strength steel or nickel alloy which can be designed for these stresses without requiring excessive radial thickness. Deflections of the composite cylinder are determined primarily by the elastic modulus of the inner and outer cylinders 45 and can be kept within the necessary limits. The intermediate cylinder 46 can be made of highly conductive material of sufficient radial thickness to have the necessary conductivity and electromagnetic time constant. Bending deflection of the composite cylinder will be accompanied by shear stresses between outside cylinders 45 and the intermediate cylinder 46. To take this shear, the cylinders must be solidly secured together. This may be done by metallurgically bonding them or by mechanically keying them together. In either case, they should be assembled with high radial pressure or an inteference fit between the adjacent cylinders. In some cases, this high radial presure together with interfitting serrations may provide sufficient shear strength.

The shield member 44 surrounds the rotor 18 and is spaced radially from the rotor structure sufficiently to avoid any possibility of rubbing. The shield extends axially over at least the active portion of the rotor, that is, over at least the entire length of the field winding 22 including the end turns. In the preferred embodiment, the inner cylinder 45 extends beyond the two outer cylinders, and extends to the ends of the rotor body to support the shield on the rotor as described below. In operation, heat will be generated in the damper-shield due to the currents induced in it by the air gap fields. Heat in the outer cylinder 45 is removed primarily by the helium or other coolant gas in the housing 10 which flows through the air gap. Considerably amounts of heat may be generated in the conductive cylinder 46 and axially extending coolant ducts 47 are preferably provided between this cylinder and the outer cylinder. Coolant gas flowing through these ducts removes the heat and cools the cylinder 46 and, if desired, a suitable blower could be provided to increase the gas flow. Heat generated in the inner cylinder 45 also flows through the cylinder 46 to the coolant ducts 47 while the ends of the inner cylinder are directly exposed to the gas in the housing.

As previously mentioned, the damper-shield must be mounted on the rotor in a manner which permits large differential thermal contraction and which protects the drive shaft against the very high transient torques which can occur under fault conditions. The shield 44 can be mounted on the rotor in any way which meets these requirements but the preferred construction is that disclosed and claimed in our copending application Ser. No. 734,943, filed Oct. 22, 1976, and assigned to the Assignee of this invention. In this construction, the drive shaft is protected from excessive torques by attaching the damper-shield 44 to the rotor only at the end opposite to the drive shaft 26. For this purpose, a disc 48 is keyed or otherwise secured to the shaft portion 30 beyond the end of the rotor body. The inner cylindrical member 45 of the damper-shield extends over the disc 48 and is welded or otherwise rigidly attached to the outer periphery of the disc. The damper-shield 44 is thus rigidly attached to the rotor at the end opposite the drive shaft. At the other or drive end, a collar having a radial flange 50 is carried on the drive shaft 26 adjacent the end of the rotor body, and the flange 50 carries a generally cylindrical support surface 51 which fits inside the end of the inner cylindrical member 45 of the damper-shield. The damper-shield 44 is thus supported on the rotor at the drive shaft end but is not attached to it. A sliding engagement which permits relative movement is thus provided between the rotor and the damper-shield at the drive end and, if desired, the support surface 51 may be made of or coated with a suitable bearing material such as bronze or a dry lubricant.

Upon the occurence of high air gap torques applied to the damper-shield 44, as under fault conditions, such torques will be transmitted to the rotor body through the shaft 30 at the end opposite the drive shaft. Since the rotor body is essentially a hollow cylinder or tube, it has a substantial amount of torsional flexibility and this flexibility is interposed between the damper-shield 44 and the drive shaft 26. The high instantaneous torques which can occur under fault conditions, therefore, are attenuated by the torsional flexibility of the rotor between the shield and the drive shaft and the torque is attenuated sufficiently in this way to protect the drive shaft by reducing the torque to a safe level. It can be shown that transient air gap torques of the order of 9 to 10 times normal torque can be attenuated in this way to about 1.5 times normal torque applied to the drive shaft.

The support of the damper-shield on the rotor at the drive end, as previously mentioned, allows both axial and circumferential relative movement between the shield and the rotor itself. These movements occur under different conditions. When the rotor is cooled down to cryogenic temperature, a relatively large longitudinal thermal contraction occurs relative to the shield which remains substantially at ambient temperature. Because of the extreme temperature difference involved, this contraction is quite large and the sliding support on the surface 51 permits this relative movement to take place with no mechanical problems. This normally occurs during initial cool-down of the rotor while it is at standstill or rotating at low speed, and the rotor is designed so that at low speed there is a light interference fit and low contact pressure between the end of the damper-shield and the support surface 51. At normal operating speed, the radial expansion of the member 51 caused by centrifugal force increases the contact pressure between the support 51 and the shield 44 and relative axial movement does not normally occur under these conditions. Under very high transient torque conditions discussed above, however, the torsional flexibility of the rotor results in circumferential slippage between the damper-shield 44 and the support surface 51 to protect the drive shaft, and the high torques involved under these conditions are sufficient to cause the necessary slippage. The damper-shield is thus supported on the drive end of the rotor in a manner which permits relative movement when necessary to provide a stable and non-slipping support during normal operating conditions.

The rotor body 19 has a smaller diameter than the damper-shield 44 and, therefore, will have a slightly greater bending deflection during operation. This results in a slight relative axial motion between the two at a frequency of once per revolution. While this is a very small motion, of the order of a few thousandths of an inch, it is sufficient to cause fretting, and to absorb this motion, the discs 48 and 50 are made thin enough to have a small amount of axial flexibility. This absorbs the relative axial motion between the rotor and the damper-shield and thus eliminates any difficulty due to this motion.

It will now be apparent that a combined damper and shield member has been provided for a generator having a superconducting field winding which satisfactorily meets all of the difficult requirements for such a member. That is, the shield provides effective electromagnetic shielding of the superconducting winding from alternating current fields in the air gap as well as providing the required damping for attenuating oscillations of the rotor. The mechanical construction is such that the generator drive shaft is protected from excessive transient torques under fault conditions by the torsional flexibility of the rotor, while the damper-shield is adequately supported on the rotor in a manner to allow the necessary movements due to thermal contraction and expansion of the rotor.

What is claimed is:

1. A rotor member for a dynamoelectric machine, said rotor member including a cylindrical rotor body carrying a field winding of superconducting material, means for circulating a cryogenic coolant fluid through said field winding, and a damper-shield member attached to the rotor member for rotation therewith, said damper-shield member being a cylindrical member surrounding the rotor body concentrically therewith and radially spaced therefrom and being a composite member consisting of three concentric cylinders disposed coaxially with their adjacent surfaces engaging each other and being rigidly secured together throughout their length, the radially inner and outer cylinders being made of a high-strength, non-magnetic material and the intermediate cylinder being made of a material of high electrical conductivity.

2. A rotor member as defined in claim 1 including means for circulating a coolant through said damper-shield member to remove heat therefrom.

3. A rotor member as defined in claim 2 in which said means for circulating said coolant through said damper-shield member includes ducts for providing the flow of said coolant extending longitudinally between the outer cylinder and the intermediate cylinder.

4. The composite member as defined in claim 1 in which said intermediate cylinder is made of copper.

5. The composite member as defined in claim 1 in which said intermediate cylinder is made of a copper alloy.

6. The composite member as defined in claim 1 in which said intermediate cylinder is made of aluminum.

7. The composite member as defined in claim 1 in which said intermediate cylinder is made of an aluminum alloy.

8. The composite member as defined in claim 1 in which said inner and outer cylinder is made of a non-magnetic nickel alloy.

9. The composite member as defined in claim 1 in which said inner and outer cylinder is made of a non-magnetic steel.

* * * * *